(12) United States Patent
Shake et al.

(10) Patent No.: US 6,409,823 B1
(45) Date of Patent: Jun. 25, 2002

(54) HYDRATION ENHANCING ADDITIVES

(75) Inventors: Michael Patrick Shake, Oak Lawn, IL (US); Salvatore C. Immordino, Trevor, WI (US); James R. Wittbold, Des Plaines, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 09/473,347

(22) Filed: Dec. 28, 1999

(51) Int. Cl.[7] .............................................. C04B 11/00
(52) U.S. Cl. ....................... 106/772; 106/819
(58) Field of Search ................. 106/772, 819

(56) References Cited

U.S. PATENT DOCUMENTS

| | | | |
|---|---|---|---|
| 2,078,199 A | 4/1937 | King ........................ | 106/34 |
| 2,216,555 A | 10/1940 | King et al. | |
| 3,592,670 A | 7/1971 | Kossuth et al. | |
| 3,870,538 A | 3/1975 | Burkard et al. | |
| 4,288,338 A | 9/1981 | Phillips | |
| 4,470,877 A | 9/1984 | Johnstone et al. | |
| 4,548,676 A | 10/1985 | Johnstone et al. | |
| 4,681,644 A | 7/1987 | Dozsa | |
| 4,786,211 A | 11/1988 | Leutner et al. ............. | 405/264 |
| 4,853,085 A | 8/1989 | Johnstone et al. | |
| 5,041,333 A | 8/1991 | Conroy | |
| 5,709,743 A | 1/1998 | Leture et al. | |
| 5,746,822 A | 5/1998 | Espinoza et al. | |

FOREIGN PATENT DOCUMENTS

| | | |
|---|---|---|
| EP | 0 262 377 A1 | 4/1988 |
| FR | 349.260 | 12/1904 |
| GB | 508 433 | 7/1938 |

*Primary Examiner*—Paul Marcantoni
(74) *Attorney, Agent, or Firm*—Greer, Burns & Crain, Ltd.; John M. Lorenzen; David F. Janci

(57) ABSTRACT

An additive for accelerating the setting reaction of gypsum products is disclosed. It comprises a gypsum accelerator combined with a bisulfate salt. The gypsum accelerator is calcium sulfate dihydrate. The accelerator may optionally be ground with a sugar, a starch and/or boric acid. A process utilizing this additive combination is also disclosed. The bisulfate salt is most advantageously prewet with a portion of the calcium sulfate hemihydrate feed before being combined with the gypsum accelerator, water and the remaining portion of the calcium sulfate hemihydrate feed in the main mixer.

30 Claims, 2 Drawing Sheets

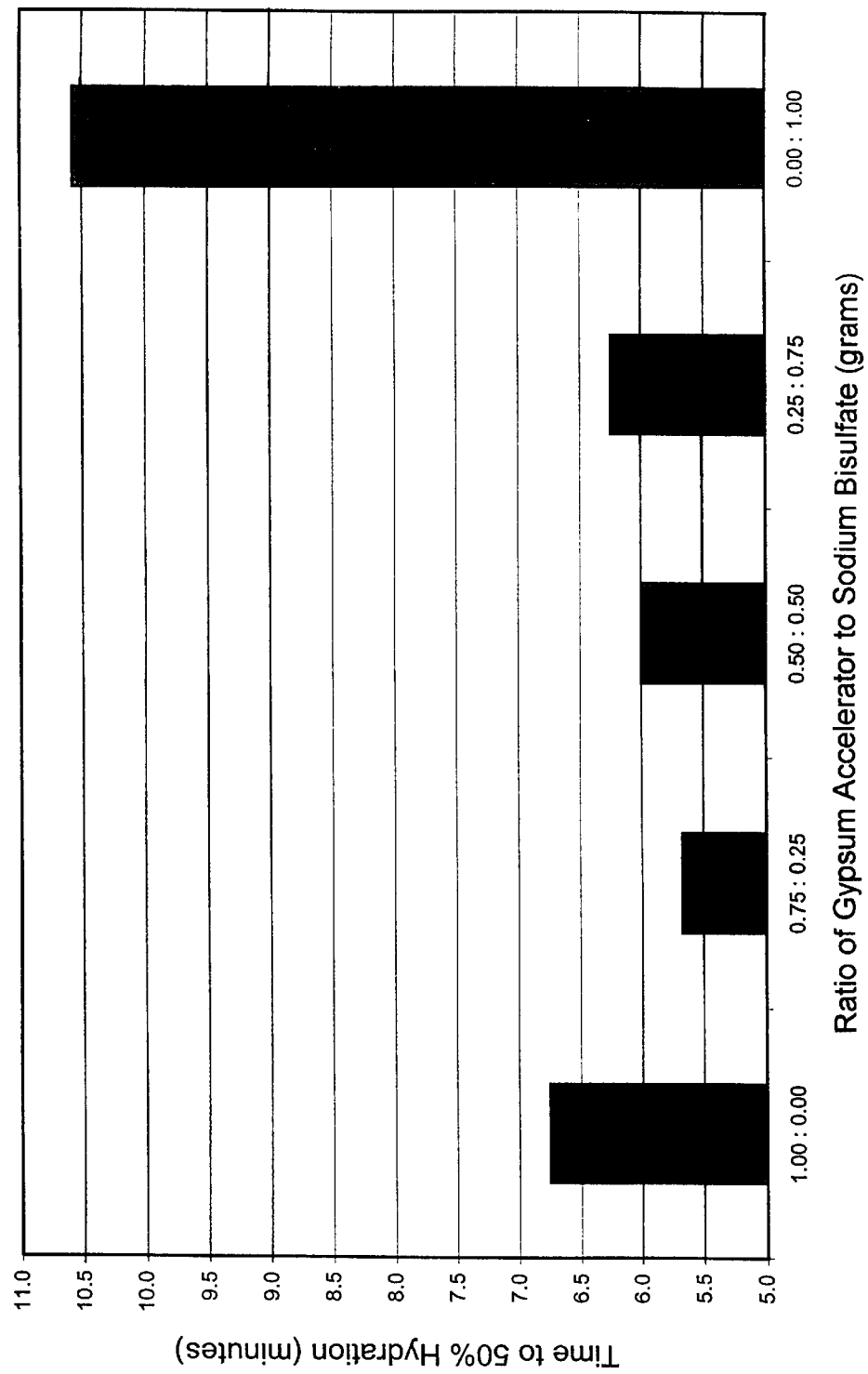

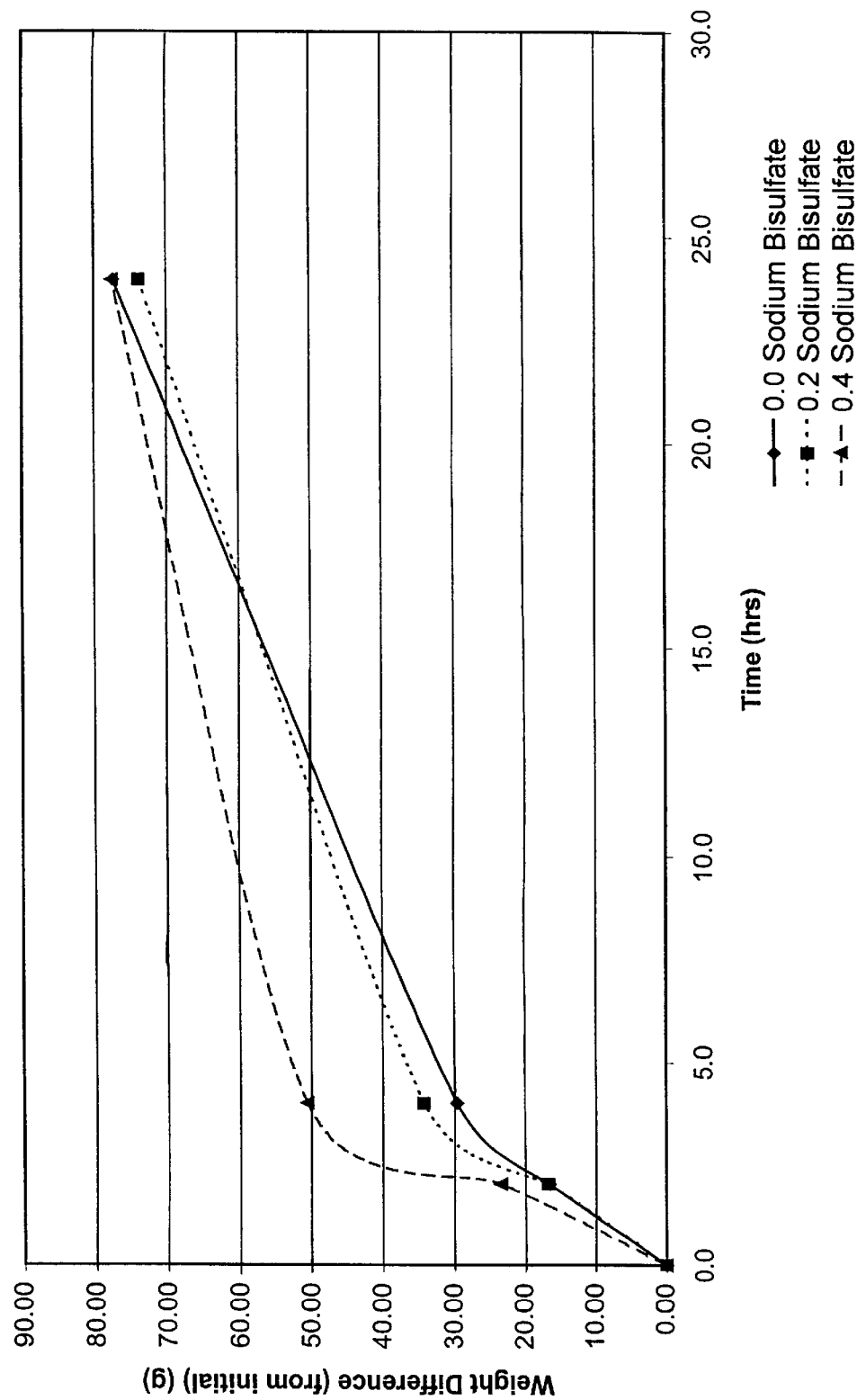

HYDRATION ENHANCING ADDITIVES

BACKGROUND OF THE INVENTION

This invention relates to an improved method for setting calcined gypsum. More specifically, it relates to the use of ground gypsum and bisulfate salts to reduce the set time, decrease the water demand and reduce the drying time when making gypsum products.

Gypsum is a very practical and cost effective building material. It is also known as calcium sulfate dihydrate. When mined calcium sulfate dihydrate has been ground, it is also referred to as landplaster. Calcium sulfate hemihydrate is also known as calcined gypsum, stucco, calcium sulfate semihydrate, calcium sulfate half-hydrate or plaster of Paris. Synthetic gypsum, which is a byproduct of flue gas desulfurization processes from power plants, may also be used. When it is mined, raw gypsum is found in the dihydrate form. In this form, there are two water molecules of water associated with each molecule of calcium sulfate. In order to produce the hemihydrate form, the gypsum can be calcined to drive off some of the water of hydration by the following equation:

$$CaSO_4.2H_2O \rightarrow CaSO_4.1/2H_2O + 3/2H_2O$$

A number of usefull gypsum products can be made by mixing the calcium sulfate hemihydrate with water to form a slurry and casting the resulting product slurry into the desired shape. The product slurry is permitted to set by allowing the calcium sulfate hemihydrate to react with sufficient water to convert the hemihydrate into a matrix of interlocking dihydrate crystals. As the crystal matrix forms, the product slurry becomes firm and holds the desired shape. Excess water must then be removed from the product by drying.

In the process for making gypsum products, the setting and drying steps are the most intensive in terms of time and energy. The setting time of the slurry depends on a number of factors, including the age of the calcined gypsum, impurities in the calcined gypsum, surface area, pH, particle size and the temperature at the time of mixing. The use of additives or process conditions that reduce the drying time of the gypsum products lead to lower costs. The lower energy costs are a result of lower temperatures or less drying time used in the drying stage. Another additive benefit would be the ability to increase the speed of production line, yielding more product with the same resources. Decreases in the amount of time required to set the product would lead to similar reduction in production costs.

Many additives are known to accelerate the hydration reaction. In the late 1950's the Bureau of Mines investigated the effect of dissolved substances on the set time of gypsum plasters. At that time the Bureau tested many substances that are impurities in either the gypsum or the water to determine if they caused any accelerative or retardive effects on hydration. Sulfates, including bisulfates, and gypsum were determined to be accelerators at that time. ("Hydration-Rate Studies of Gypsum Plasters: Effects of Small Amounts of Dissolved Substances" J. P. Coughlin, K. C. Conway, M. F. Koehler and D. F. Barry, Bureau of Mines Report of Investigations 5477, 1959.)

U.S. Pat. No. 2,216,555 ("King") teaches that acid-reacting soluble sulfates, including bisulfates, are known to accelerate. However, acidic sulfates also tend to react with impurities in the raw gypsum, particularly carbonates. King solves this problem by adding lime and set retarders to the plaster to control these decomposition reactions with carbonates. However, plasters containing an excess of lime form a thin, soft skin of unset plaster on the surface of the gypsum product which may lead to surface imperfections.

Ground gypsum has also been known as a set accelerator, particularly when combined with a coating such as a starch, as in U.S. Pat. No. 3,870,538, or a sugar, as in U.S. Pat. No. 4,681,644. It is thought that the addition of the dihydrate serves as "seed crystals," or nucleation sites promoting faster growth of the dihydrate crystals in the hydrating product slurry. Gypsum is very active when freshly ground, but upon aging its effectiveness decreases rapidly. Thus, it is preferable to provide a coating for the gypsum, that will reduce deactivation of the material over time.

The speed at which the gypsum products may be dried is determined by two factors. Water demand is the amount of water needed to produce a slurry of a certain fluidity. It can be changed by the use of rheology modifying additives to the gypsum slurry. Additives that increase the water demand will lengthen the drying time of the gypsum products. Even where the same amount of water is added to the slurry, additives may also change the rate at which excess water is driven off from the formed product. As the excess water evaporates, capillary action draws water from the interior of the crystal matrix toward the surface of the product. When the water is hindered from moving to the surface, the drying process is slowed. If an additive increases water demand or decreases the rate at which excess water evaporates from the product, it may result in the need to slow the production line, increase kiln exposure time, or incur greater energy costs from higher kiln temperatures. Any of these alternatives leads to higher production costs for the gypsum products.

It is an object of this invention to provide a more economical method for making set gypsum articles by reducing production costs.

It is another object of this invention to provide an improved accelerator for increasing the rate at which calcined gypsum is set.

It is still another object of this invention to reduce the cost of drying gypsum articles by reducing the water demand of the slurry.

It is yet another object of this invention to provide an economical method of making set gypsum products that release excess water more easily and dry faster.

BRIEF SUMMARY OF THE INVENTION

The above-listed objects are met or exceeded by the present additive composition and process for making set gypsum products, which features a novel system of additives to significantly reduce the time and energy required to hydrate and dry gypsum products.

More specifically, the present invention provides additives for accelerating the setting reaction of calcined gypsum comprising a gypsum accelerator combined with a bisulfate salt. The gypsum accelerator comprises ground calcium sulfate dihydrate. In a preferred embodiment the gypsum accelerator is treated with a coating agent such as a starch, a sugar, and/or boric acid. In the preferred embodiment, the additives are used in a process in which the bisulfate salt and a portion of the calcium sulfate hemihydrate are prewet prior to mixing in a main mixer.

It has been discovered that when bisulfate salts are used together with a gypsum accelerator a surprising effect is observed. The combination of the two ingredients gives a faster set rate than when either of the two additives are used separately. Further, when used with the gypsum accelerator, there have been no significant reductions in the strength of the product as is seen with some additives in the prior art.

Faster set of the product results in more efficient product manufacture. When the product hydrates more quickly, the speed of the production line may be increased, making more product in the same time period. If production facilities are being newly built or redesigned, the line could be made smaller for a given production rate, allowing the space saved to be utilized for another purpose.

This combination of additives also provides additional benefits to the process of setting calcined gypsum that have not been previously observed in the prior art with these additives individually. One significant additional benefit is a reduction in the amount of energy required to dry the product. The additives of the present invention decrease drying time in two ways. First, less water is needed to form the slurry because the flowability of the slurry is improved. This results in less excess water present in the product after the hydration reaction is complete. In addition, excess water that is present is more easily removed. Thus, the same amount of product can be made by reducing the temperature of the drying kiln, yielding a direct savings in energy costs. Speed of the production lines can be increased, making more product for the same amount of fuel consumed. Either of these methods, or a combination of both of them, may be used to reduce the energy costs per unit of product.

It is also believed that the additives of the present invention reduce scaling and prevent the build up of calcium deposits in the mixing equipment. Where equipment stays cleaner longer, there is less down time on the line to clean and service it. Each of these benefits of the present invention can lead to a more cost effective means of producing gypsum products.

BRIEF DESCRIPTION OF THE DRAWINGS

FIG. 1 shows the time required to achieve 50% hydration for various mixtures of sodium bisulfate and gypsum accelerator.

FIG. 2 shows the drying time of gypsum board for various mixtures of sodium bisulfate and gypsum accelerator.

DETAILED DESCRIPTION OF THE INVENTION

The present invention discloses an additive and a method of producing calcium sulfate based products which result in both a faster setting and drying product. Such products are made using calcium sulfate hemihydrate slurry containing a bisulfate salt and a gypsum accelerator.

The bisulfate salt can be any known bisulfate salt. Potassium bisulfate and sodium bisulfate are the preferred salts. Sodium bisulfate is the most preferred salt because it is readily available in commercial quantities at a reasonable cost. However, other bisulfates, such as potassium bisulfate, ammonium bisulfate or metal bisulfates could also be used in the present invention. The salt should be added in amounts ranging from about 0.1 pounds to about 10 pounds per ton of the dry calcium sulfate hemihydrate. Preferably, the salt should be present in amounts of from about 1 pound to about 2 pounds per ton of stucco.

One advantage of the use of bisulfates over some other accelerating agents is that the acceleration in the set of the plaster occurs primarily during the final set or tail end of hydration of the product. This has a distinct advantage in the ability to easily form the product into the desired shape. For example, when the desired product is a gypsum board, if the slurry thickens too fast, it may begin to set up before the board is properly shaped. This may result in board of uneven thickness, with surface ripples, or irregularly shaped edges. When, as here, the accelerator acts primarily toward the end of the setting process, there is sufficient time to properly shape the end product, yet still take full advantage of the accelerated setting process.

The second component of this additive is a gypsum accelerator. In its simplest form, the accelerator is made up of ground calcium sulfate dihydrate. Mined and ground natural dihydrate, known as landplaster, is generally used. However, other sources, such as synthetic gypsum from flue gas desulfurization processes may also be used. Gypsum accelerator is present in amounts ranging from about three pounds to about fifty pounds per ton of dry calcium sulfate hemihydrate.

If the gypsum accelerator is not to be used immediately after grinding, it is preferred that the dihydrate be treated with a coating agent to prevent it from becoming inactive over time. Any coating agent known in the art may be used that possesses certain properties. The coating agent must not retard the set time of the calcium sulfate hemihydrate to which it is added. Physical properties of the product should also not be harmed by the coating agent. When the calcium sulfate hemihydrate with its additives are added to the mixer with water to form a slurry, the coating agent must dissolve away to expose the active sites of the highly fractured dihydrate crystals. Coating agents that are particularly suitable include starches, sugars, and boric acid or any combination of these compounds. The amount of coating agent present may range from about 5% to about 25% based on the weight of the calcium sulfate dihydrate feed stream.

When a coating agent is used, the dihydrate crystals and the coating agent may be ground together to achieve size reduction and also to promote intimate association between the coating agent and the dihydrate. Grinding of the materials may be done using any grinding apparatus known in the art. A preferred grinding apparatus is a ball mill. Preparation of ground mixtures of calcium sulfate dihydrate and coating agents are known in the art, particularly in U.S. Pat. No. 3,573,947 which is herein incorporated by reference.

In the most preferred embodiment, the coating may be melted over the surface of the dihydrate to maintain the activity of the ground dihydrate over long periods of time. Sugars, such as glucose, sucrose and dextrose are particularly preferred for this embodiment, although any sugar that melts sufficiently at temperatures under 270° F. may be used in the gypsum accelerator.

The mixture may then optionally be heated to melt and caramelize the sugar, allowing it to coat the surface of the ground calcium sulfate dihyrate. This option is preferred if the gypsum accelerator must be stored for later use or shipped to another location. The complete coating and caramelization of the sugar serves to seal up the surface of the gypsum particles, making them less susceptible to the effects of aging. The caramelized coating completely dissolves when the additive is mixed with water in the product slurry, exposing the surface of the highly fractured dihydrate crystal. The dihydrate particles serve as "seed crystals," promoting crystal growth as the hemihydrate is hydrated to form an interlocking matrix of dihydrate crystals. Excellent accelerator activity is obtained by heating the coated dihydrate to 250° F., but the temperature may be as low as 175° F. Usually temperatures above about 270° F. should be avoided because they make it difficult to control the moisture content of the accelerator.

Calcium sulfate hemihydrate is fed to the process by any method known in the art. Many additives are known to change or enhance the properties of the hydration reaction or the finished products. Dry or powder additives are generally trickled into the dry hemihydrate stream as it moves toward the main mixer. Any methods of producing a constant volume stream of the dry additive may be employed, such as screw feeders, hoppers, or conveyers. Liquid additives may be added into the mixer or premixed with the water that is added to the main mixer.

In another embodiment, an amount of the calcium sulfate hemihydrate may be pretreated by mixing it with water. This technique is described in U.S. Pat. No. 4,201,595, and is herein incorporated by reference. All or a portion of the calcium sulfate hemihydrate may be diverted from the main feed stream as a slipstream. It is preferred that the bisulfate salt be added to the hemihydrate in the slipstream before pretreatment with water. Prewetting the bisulfate salt is thought to activate it by predispersing at least a portion of it in the slipstream. The technique results in better dispersion and activity of the salt. Benefits of the additive combination, such as accelerated setting, faster drying times and decreased water demand are enhanced to an even greater degree when the bisulfate salt is pretreated with water.

Methods of adding the water to the calcium sulfate hemihydrate and bisulfate salt are known to those skilled in the art. Dry ingredients on a conveyor may simply be sprayed with water. A more preferred process uses equipment that will blend a high viscosity substance such as a mass of damp, granular materials. Many commercial mixers and blenders are suitable. Most preferred is use of a Scott Blender (Scott Equipment Company, Jordan, Minn.). The water and calcium sulfate hemihydrate may be charged to the blender simultaneously. Mixing in this fashion brings the particles of the various dry ingredients into close proximity with each other and also distributes the water among the dry ingredients. After mixing, the contents of the blender are discharged into the main calcium sulfate hemihydrate feedstock stream, shortly before entering a main mixer. The prewet slipstream may also be charged directly to the main mixer.

The amount of water used in the pretreatment ranges from about 1% to about 10% by weight of the calcium sulfate hemihydrate in the slip stream. In a preferred embodiment, water in an amount of from about 3% to about 5% is added to the calcium sulfate hemihydrate mixture. Water addition allows the calcium sulfate hemihydrate crystals to heal. "Healing" refers to allowing the fractures on the particles to fuse due to surface hydration. Subsequent disintegration of the particle during slurry mixing is reduced. Preferred healing times range from about 1 to about 6 minutes. Healing times are measured from the time the stucco plus all additives are wetted until they are fed to the main mixer. Generally, the gypsum accelerator should be added to the dry hemihydrate stream just before it is fed into the main mixer. If all of the calcium sulfate hemihydrate has been pre-wetted, then the gypsum accelerator is added as the pre-wet stucco moves from the blender to the mixer. Preferably, the wetted stucco and the remaining dry hemihydrate are both fed to the main mixer concurrently.

The total feedstock mixture, including the stucco feed, the prewet slipstream and all additives, is dissolved in an additional quantity of water in the main mixer. Sufficient water must be added to convert the calcium sulfate hemihydrate to the dihydrate and to make the slurry adequately fluid for its intended use. Use of the additives and process of this invention may reduce the water demand for gypsum board manufacture to about 50 to about 85 parts by weight of water per 100 parts by weight of calcined gypsum, compared to a normal water demand of about 85 to about 100 parts by weight of water per 100 parts by weight of calcined gypsum. The slurry is then shaped into the desired product, such as gypsum board, molds and the like, and allowed to set. During the setting process, the calcium hemihydrate absorbs water due to the hydration reaction, converts into an interlocking matrix of dihydrate crystals and becomes hard.

A final step in the product preparation is driving off the excess water. Any suitable process may be used to reduce the excess water and dry the product. It can be allowed to evaporate at ambient temperature and pressure. All or a portion of the drying process may be hastened by using elevated temperatures to increase evaporation, such as kiln drying. For example, gypsum board may be kiln dried until approximately 90% of the excess moisture has been driven off. The remaining water evaporates at ambient conditions.

Conventional additives may be used in conjunction with this additive composition or process. For example, common chemical dispersing or fluidizing agents for calcined gypsum, such as lignin, lignosulfates, lignosulfonates and condensation polymerization products thereof may be included in minor amounts to enable the use of even less mixing water without interfering with the water reducing effects accomplished by the present invention. In this manner, it may be possible to achieve even lower total water mixing requirements, such as on the order of about 50 parts by weight of water per 100 parts by weight of the formulated calcined gypsum.

EXAMPLES 1–5

For each test, 200 grams of calcium sulfate hemihydrate (USG, Southard plant) were measured and set aside. Appropriate amounts of sodium bisulfate and a gypsum accelerator as indicated in Table I were measured. The gypsum accelerator was made up of 95% landplaster and 5% sugar, ground together. The landplaster (USG, Southard plant) used in the accelerator comprises 96% dihydrate and 4% impurities. After grinding, the coated landplaster was heated to approximately 250° F. to melt the sugar over the surface of the landplaster. The calcium sulfate hemihydrate, sodium bisulfate and gypsum accelerator powders were blended together until all were thoroughly dispersed. A 280 ml quantity of water at 70° F. was measured and poured into a Waring blender with high sheer blades. The powdered mixture was allowed to soak for 7 seconds, then blended on high speed for 7 seconds to form a slurry.

The slurry was poured into a cup, which was then placed into an insulated styrofoam container to minimize heat transfer with the environment. A temperature probe was placed into the middle of the slurry, and the temperature was recorded every 5 seconds. Since the setting reaction is exothermic, the extent of the reaction can be measured by the temperature rise. The time to 50% hydration was determined to be the time to reach the temperature half way between the minimum and maximum temperatures recorded during the test. Time to 50% hydration was recorded for several levels of CSA and sodium bisulfate as follows:

TABLE I

| Example | CSA, grams | Sodium Bisulfate, grams | Time to 50% Hydration |
| --- | --- | --- | --- |
| 1 | 1.0 | 0.0 | 6.75 minutes |
| 2 | 0.75 | 0.25 | 5.67 minutes |

TABLE I-continued

| Example | CSA, grams | Sodium Bisulfate, grams | Time to 50% Hydration |
|---|---|---|---|
| 3 | 0.50 | 0.50 | 6.00 minutes |
| 4 | 0.25 | 0.75 | 6.25 minutes |
| 5 | 0.0 | 1.0 | 10.58 minutes |

The beneficial use of these two additives is clear in these examples. When the total amount of additives was kept at 1 gram per 200 grams of calcium sulfate hemihydrate, the time to 50% hydration is less for all demonstrated mixtures than for either component alone. FIG. 1 graphically represents this data, showing the effect of these additive combinations on the set time.

EXAMPLE 6

The additive of the present invention was added to a commercial line of ½" SHEETROCK® brand gypsum wallboard. All amounts stated in this example are on the basis of one thousand square feet of ½" board produced.

A main feed stream, in the amount of 1135 pounds of calcined gypsum (USG, Empire plant) was fed to the process. A slipstream of one percent of the calcium sulfate hemihydrate was diverted from the main feed stream. Sodium bisulfate, (Jones-Hamilton) was ground until it passed through a 40 mesh sieve and added to the slip stream at the rate of 2 pounds per thousand square feet of finished wallboard. The bisulfate salt was added with an AccuRate powder feeder (AccuRate, Inc., Whitewater, Wis.). The slipstream with the bisulfate was added by a screw feeder into a Scott blender (Scott Equipment Company, Jordan, Minn.).

Approximately 22 pounds per minute, or 4.6% water was added in order to pre-wet the mixture. The water was dispersed throughout the calcium sulfate hemihydrate and the bisulfate salt in the Scott blender. From the exit of the Scott blender, the prewet stucco and additive mixture was sent by conveyor to the board mixer. The mixture had the opportunity to heal from the exit of the Scott blender until the stucco entered the board mixer, approximately 3 minutes.

The gypsum accelerator was prepared from landplaster (USG, Empire plant) which consisted of approximately 85% calcium sulfate dihydrate and 15% impurities. Grinding of the landplaster and sugar took place in a ball mill. The gypsum accelerator was then added to the board mixer at the rate of about 17 pounds per thousand square feet of wallboard product. In the board mixer, 1135 pounds of water was added to the wetted calcium sulfate and bisulfate salt mixture from the Scott blender, the gypsum accelerator and the main feed hemihydrate feed stream to form a slurry.

Production gypsum board was made from the gypsum slurry. At the point where the board is cut, hydration of the board was 10% higher with both sodium bisulfate and gypsum accelerator added compared to the same board without the sodium bisulfate. Water addition to the main mixer was kept constant throughout the test, but an increase in fluidity of the slurry was observed where the higher level of bisulfate was added. Additionally, physical properties of the board show that compressive strength and nail pull resistance were approximately the same as the same board without the bisulfate salt added.

EXAMPLES 7–9

For each test, 200 grams of calcium sulfate hemihydrate (USG, Southard plant) were measured and set aside. Appropriate amounts of sodium bisulfate as indicated in Table II were measured. Two grams of gypsum accelerator were measured for each test. The gypsum accelerator was made up of 95% landplaster and 5% sugar, ground together. Landplaster (USG, Southard plant) used in the accelerator comprises 96% dihydrate and 4% impurities. After grinding the sugar and landplaster together, the coated landplaster was heated to approximately 250° F. to melt the sugar over the surface of the landplaster. The gypsum was cooled to room temperature before use. The calcium sulfate hemihydrate, sodium bisulfate and gypsum accelerator powders were blended together until all were thoroughly dispersed. A 280 ml quantity of water at 67° F. was measured and poured into a Waring blender with high sheer blades. The powdered mixture was allowed to soak for 7 seconds, then blended on high speed for 7 seconds to form a slurry.

Three cubes were cast for each composition. The cubes were weighed at the indicated intervals, the weights averaged and the results are shown in TABLE II.

TABLE II

| Ex No | Sodium Bisulfate | Weight of Cube at Specified Time, grams | | | | | | |
|---|---|---|---|---|---|---|---|---|
| | | 0 Hrs. | 2 Hrs. | 4 Hrs. | 24 Hrs. | 50 Hrs. | 52.5 Hrs. | 117 Hrs. |
| 7 | 0.0 g. | 146.57 | 130.03 | 116.94 | 69.20 | 69.23* | 69.27 | 69.24 |
| 8 | 0.2 g. | 138.37 | 121.66 | 104.11 | 64.61 | 64.63 | 64.63 | 64.66 |
| 9 | 0.4 g. | 146.55 | 123.13 | 95.96 | 69.02 | 69.03 | 69.00** | 69.03 |

*This value was measured at 48 hours.
**This value was measured at 52.0 hours.

The change in weights over time as the excess water evaporated was used to estimate drying rates of each of the compositions as shown in FIG. 2. Increasing the amount of bisulfate salt, where the amount of gypsum accelerator is held at a constant level, led to faster drying times. Since the amount of water added to each of these samples was constant, the faster drying times reflect improvements in the drying rate.

While a particular embodiment of the hydration enhancing feature of the invention has been shown and described, it will be appreciated by those skilled in the art that changes and modifications may be made thereto without departing from the invention in its broader aspects and as set forth in the following claims.

What is claimed is:

1. An additive for accelerating the setting reaction of calcium sulfate hemihydrate and water comprising a gypsum accelerator combined with a bisulfate salt, said gypsum accelerator comprising a ground calcium sulfate dihydrate and said bisulfate salt being present in an amount of from about 0.1 pounds to about 10 pounds per ton of the dry calcium sulfate hemihydrate.

2. The additive of claim 1 wherein said gypsum accelerator further comprises a coating agent.

3. The additive of claim 2 wherein said coating agent comprises one of a starch, a sugar, boric acid and combinations thereof.

4. The additive of claim 3 wherein said sugar comprises one of dextrose, sucrose, glucose and combinations thereof.

5. The additive of claim 4 wherein said sugar is melted over the surface of said calcium sulfate dihydrate.

6. The additive of claim 1 wherein said bisulfate salt is one of sodium bisulfate and potassium bisulfate.

7. The additive of claim 6 wherein said bisulfate salt is sodium bisulfate.

8. The additive of claim 4 wherein said sugar is present in an amount of from about 5% to about 25% based on the weight of said calcium sulfate dihydrate.

9. A method for accelerating the setting reaction of calcium sulfate hemihydrate and water comprising:
    mixing a gypsum accelerator, a bisulfate salt, calcium sulfate hemihydrate and water to form a slurry, said gypsum accelerator comprising ground calcium sulfate dihydrate, said bisulfate salt being present in an amount of from about 0.1 pounds to about 10 pounds per ton of the dry calcium sulfate hemihydrate;
    forming said slurry into a shape; and
    allowing said slurry to set.

10. The method of claim 9 wherein said gypsum accelerator further comprises a coating agent.

11. The method of claim 10 wherein said coating agent comprises one of a starch, a sugar, boric acid and combinations thereof.

12. The method of claim 11 wherein said sugar comprises one of sucrose, dextrose, glucose and combinations thereof.

13. The method of claim 12 wherein said sugar is melted over the surface of said calcium sulfate dihydrate.

14. The method of claim 13 wherein said gypsum accelerator comprises from about 5% to about 25% sugar based on the weight of the calcium sulfate dihydrate.

15. The method of claim 14 wherein said gypsum accelerator is present in an amount of from about 3 pounds to about 60 pounds per ton of the dry calcium sulfate hemihydrate.

16. The method of claim 9 wherein said bisulfate salt is one of sodium bisulfate and potassium bisulfate.

17. The method of claim 16 wherein said bisulfate salt is sodium bisulfate.

18. The method of claim 9 further comprising pretreating said bisulfate salt by blending said bisulfate salt with a part of said calcium sulfate hemihydrate and wetting said bisulfate salt and said part of said calcium sulfate hemihydrate with a part of said water prior to mixing said bisulfate salt, said part of said calcium sulfate hemihydrate, and said part of said water with said gypsum accelerator, the rest of said calcium sulfate hemihydrate and the rest of said water.

19. The method of claim 18 wherein said part of said water is about 1% to about 10% based on the weight of said part of said calcium sulfate hemihydrate.

20. The method of claim 18 wherein said gypsum accelerator further comprises a coating agent, said coating agent comprising one of a starch, a sugar, boric acid and combinations thereof.

21. A method of making a calcium sulfate product comprising:
    feeding a first portion of calcium sulfate hemihydrate to a blender,
    adding a bisulfate salt and a first portion of water to said first portion of calcium sulfate hemihydrate in said blender, the amount of said first portion of water ranging from about 1% to 10% based on the weight of said first portion of calcium sulfate hemihydrate;
    blending said bisulfate salt, said first portion of water and said first portion of calcium sulfate hemihydrate in said blender, said bisulfate salt being present in an amount of from about 0.1 pounds to about 10 pounds per ton of the dry calcium sulfate hemihydrate;
    adding said bisulfate salt and said first portion of calcium sulfate hemihydrate prewetted with said first portion of water, a second portion of calcium sulfate hemihydrate and a gypsum accelerator to a mixer, said gypsum accelerator comprising ground calcium sulfate dihydrate;
    adding a second portion of water to said mixer to form a slurry;
    mixing said slurry;
    forming said slurry into a desired shape; and allowing said slurry to set.

22. The method of claim 21 wherein said gypsum accelerator further comprises a coating agent.

23. The method of claim 22 wherein said coating agent comprises one of a starch, a sugar, boric acid and a combination thereof.

24. The method of claim 23 wherein said sugar comprises one of sucrose, dextrose, glucose and combinations thereof.

25. The method of claim 24 wherein said sugar is melted over the surface of said calcium sulfate dihydrate.

26. The method of claim 21 wherein said bisulfate salt is one of sodium bisulfate and potassium bisulfate.

27. The method of claim 21 wherein said bisulfate salt is sodium bisulfate.

28. The method of claim 23 wherein said sugar in said gypsum accelerator is present in an amount of from about 5% to about 25% based on the weight of the calcium sulfate dihydrate.

29. The method of claim 21 wherein said first portion of water is present in an amount of from 1% to about 8% by weight of said first portion of calcium sulfate hemihydrate.

30. The method of claim 21 wherein said first portion of water is present in an amount of from about 3% to about 5% based on the weight of said first portion of calcium sulfate hemihydrate.

* * * * *

UNITED STATES PATENT AND TRADEMARK OFFICE
CERTIFICATE OF CORRECTION

PATENT NO. : 6,409,823 B1
DATED : June 25, 2002
INVENTOR(S) : Shake et al.

It is certified that error appears in the above-identified patent and that said Letters Patent is hereby corrected as shown below:

Column 9,
Line 25, after "a", insert -- desired --

Column 10,
Line 4, delete "," after "blender" and insert -- ; --

Signed and Sealed this

Fourth Day of May, 2004

JON W. DUDAS
*Acting Director of the United States Patent and Trademark Office*